(12) United States Patent
Lee

(10) Patent No.: US 12,445,147 B2
(45) Date of Patent: Oct. 14, 2025

(54) BATTERY INFORMATION COMPRESSION APPARATUS AND METHOD

(71) Applicant: LG ENERGY SOLUTION, LTD., Seoul (KR)

(72) Inventor: Jung-Hoon Lee, Daejeon (KR)

(73) Assignee: LG ENERGY SOLUTIONS LTD., Seoul (KR)

( * ) Notice: Subject to any disclaimer, the term of this patent is extended or adjusted under 35 U.S.C. 154(b) by 0 days.

(21) Appl. No.: 18/277,978

(22) PCT Filed: Oct. 21, 2022

(86) PCT No.: PCT/KR2022/016159
§ 371 (c)(1),
(2) Date: Aug. 18, 2023

(87) PCT Pub. No.: WO2023/075312
PCT Pub. Date: May 4, 2023

(65) Prior Publication Data
US 2024/0128983 A1    Apr. 18, 2024

(30) Foreign Application Priority Data
Nov. 1, 2021   (KR) .................. 10-2021-0148327

(51) Int. Cl.
*H03M 7/30*    (2006.01)
(52) U.S. Cl.
CPC .................................. *H03M 7/60* (2013.01)
(58) Field of Classification Search
CPC ..... H03M 7/60; G01R 31/371; G01R 31/367; G01R 31/396; G01R 31/3648
See application file for complete search history.

(56) References Cited

U.S. PATENT DOCUMENTS

| | | | | |
|---|---|---|---|---|
| 7,411,315 | B2 * | 8/2008 | Gottlieb ................ | H02J 7/0013 |
| | | | | 307/66 |
| 8,103,266 | B2 * | 1/2012 | Fok ....................... | H01M 10/48 |
| | | | | 455/67.11 |

(Continued)

FOREIGN PATENT DOCUMENTS

| | | |
|---|---|---|
| CN | 105634501 A | 6/2016 |
| CN | 108206309 A | 6/2018 |

(Continued)

OTHER PUBLICATIONS

Wang Rui et al., "Research on Characteristic Compression Processing Based on Massive Power Battery Data", Electrical Measurement and Instrumentation, vol. 57, No. 1, pp. 99-105, Jan. 31, 2020.

*Primary Examiner* — Lam T Mai
(74) *Attorney, Agent, or Firm* — Bryan Cave Leighton Paisner LLP

(57) ABSTRACT

A battery information compression apparatus according to an embodiment of the present disclosure includes a battery information obtaining unit obtaining battery information for each of a plurality of batteries; and a communication code generating unit determining a representative value for a plurality of battery information, calculating a reference value for each of the plurality of battery information based on the plurality of battery information and the representative value, determining a first encoding code corresponding to the representative value and a second encoding code corresponding to the plurality of determined reference values according to a preset encoding rule, and generating a communication code including the first encoding code and the second encoding code.

11 Claims, 6 Drawing Sheets

(56) References Cited

U.S. PATENT DOCUMENTS

| | | | |
|---|---|---|---|
| 10,435,869 B2* | 10/2019 | Lee | H04L 69/04 |
| 10,914,789 B2* | 2/2021 | Lemkin | H01M 10/425 |
| 11,482,763 B2* | 10/2022 | Son | H01M 10/446 |
| 12,078,683 B2* | 9/2024 | Jo | G01R 31/367 |
| 12,166,194 B2* | 12/2024 | Song | H01M 4/0471 |
| 2006/0006876 A1 | 1/2006 | Bertness | |
| 2006/0217152 A1* | 9/2006 | Fok | H02J 7/0047 455/557 |
| 2012/0274281 A1 | 11/2012 | Kim | |
| 2014/0180514 A1 | 6/2014 | Becker et al. | |
| 2015/0115969 A1 | 4/2015 | Ishida et al. | |
| 2016/0195587 A1* | 7/2016 | Lee | G01R 31/392 702/63 |
| 2018/0183460 A1* | 6/2018 | Lee | H03M 13/6588 |
| 2019/0020743 A1* | 1/2019 | Cheng | H04L 69/324 |
| 2019/0195953 A1* | 6/2019 | Komiyama | B60L 58/10 |
| 2019/0242949 A1 | 8/2019 | Lemkin et al. | |
| 2022/0158255 A1 | 5/2022 | Choi et al. | |
| 2022/0352563 A1 | 11/2022 | Park | |
| 2024/0039056 A1* | 2/2024 | Kim | H01M 50/209 |
| 2024/0047806 A1* | 2/2024 | Kwon | H01M 50/264 |
| 2024/0072387 A1* | 2/2024 | Park | H01M 50/536 |
| 2024/0142322 A1* | 5/2024 | Lee | G01B 7/16 |
| 2024/0291312 A1* | 8/2024 | Lee | B60L 53/24 |
| 2024/0322316 A1* | 9/2024 | Oh | H01M 50/179 |
| 2024/0332713 A1* | 10/2024 | Keum | H01M 50/271 |

FOREIGN PATENT DOCUMENTS

| | | |
|---|---|---|
| CN | 110912563 A | 3/2020 |
| CN | 112350734 A | 2/2021 |
| JP | 5842054 B2 | 1/2016 |
| JP | 2019-527528 A | 9/2019 |
| KR | 10-2012-0076068 A | 7/2012 |
| KR | 10-2014-0089955 A | 7/2014 |
| KR | 10-2014-0068633 A | 9/2014 |
| KR | 10-1610086 B1 | 4/2016 |
| KR | 10-2138892 B1 | 7/2020 |
| KR | 10-2021-0036258 A | 4/2021 |
| KR | 10-2021-0050992 A | 5/2021 |
| WO | 2021/096250 A1 | 5/2021 |

* cited by examiner

| BATTERY | VOLTAGE VALUE AT T1 TIME POINT [mV] | VOLTAGE VALUE AT T2 TIME POINT [mV] | VOLTAGE DIFFERENCE [mV] | REFERENCE VALUE [mV] |
|---|---|---|---|---|
| FIRST BATTERY(B1) | 3000 | 2999 | -1 | 5 |
| SECOND BATTERY(B2) | 3010 | 3010 | 0 | 6 |
| THIRD BATTERY(B3) | 3002 | 3001 | -1 | 5 |
| FOURTH BATTERY(B4) | 3001 | 2995 | -6(RV) | 0 |

FIG. 3

| FIRST HEADER CODE (HC1) | FIRST BODY CODE (BC1) | SECOND HEADER CODE (HC2) | SECOND BODY CODE OF FIRST BATTERY(B1) (BC21) | SECOND BODY CODE OF SECOND BATTERY(B2) (BC22) | SECOND BODY CODE OF THIRD BATTERY(B3) (BC23) | SECOND BODY CODE OF FOURTH BATTERY (B4) (BC24) |
|---|---|---|---|---|---|---|

FIRST ENCODING CODE(EC1): HC1 + BC1
SECOND ENCODING CODE(EC2): HC2 + BC21 + BC22 + BC23 + BC24
COMMUNICATION CODE(TC): EC1 + EC2

FIG. 4

FIRST ENCODING RULE(ER1)

| FIRST HEADER CODE(HC1) | LENGTH OF FIRST BODY CODE(BC1) | FIRST REFERENCE REGION(RR1) | |
|---|---|---|---|
| | | MINIMUM VALUE | MAXIMUM VALUE |
| 0 | 0 | 0 | 0 |
| 10 | 2 | -2 | 1 |
| 110 | 3 | -4 | 3 |
| 1110 | 4 | -8 | 7 |
| 1111 | 13 | -4096 | 4095 |

FIG. 5

SECOND ENCODING RULE(ER2)

| SECOND HEADER CODE(HC2) | LENGTH OF SECOND BODY CODE(BC2) | SECOND REFERENCE REGION(RR1) | |
|---|---|---|---|
| | | MINIMUM VALUE | MAXIMUM VALUE |
| 00 | 0 | 0 | 0 |
| 01 | 1 | 0 | 1 |
| 10 | 2 | 0 | 3 |
| 110 | 3 | 0 | 7 |
| 1110 | 4 | 0 | 15 |
| 11110 | 8 | 0 | 255 |
| 11111 | 13 | 0 | 8191 |

BATTERY INFORMATION COMPRESSION APPARATUS AND METHOD

CROSS-REFERENCE TO RELATED APPLICATIONS

This application is a National Phase entry pursuant to 35 U.S.C. § 371 of International Application No. PCT/KR2022/016159, filed on Oct. 21, 2022, and claims the benefit of and priority to Korean Patent Application No. 10-2021-0148327, filed on Nov. 1, 2021, the disclosures of which are incorporated by reference in their entirety for all purposes as if fully set forth herein.

TECHNICAL FIELD

The present disclosure relates to a battery information compression apparatus and method, and more particularly, to a battery information compression apparatus and method capable of effectively compressing a plurality of battery information by encoding the plurality of battery information.

BACKGROUND

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

Generally, battery information (e.g., voltage, current, temperature, etc.) is measured by a battery management system (BMS). In addition, the battery management system may estimate a state of charge (SOC) and a state of health (SOH) by processing the measured battery information. In addition, the battery management system may transmit the battery information and/or the estimated information to an external device such as a higher BMS, an embedded system, or a server.

In particular, many studies are being conducted in terms of high-capacity and high-density batteries, and accordingly, the amount of periodically obtained battery information is increasing.

Recently, due to the limitations of the specifications (e.g., storage space) of the battery management system, a study of transmitting a large amount of battery information to the server using OTA (Over the air), etc. and processing the large amount of battery information by the server to analyze the state of the battery is in progress.

In the transmission process of such battery information, it is important to transmit the battery information to the server in real time. However, when the battery management system transmits the obtained battery information to the server without compressing the obtained battery information, there is a problem in that enormous resources are required.

In order to solve this problem, when a conventional battery information output algorithm is used in the battery management system, the obtained battery information may not be transmitted in real time because it is required to output a large amount of battery information in block unit.

Therefore, it is necessary to develop a technology capable of efficiently reducing system resources required for transmission while transmitting a large amount of battery information in real time.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure is designed to solve the problems of the related art, and therefore the present disclosure is directed to providing a battery information compression apparatus and method for compressing battery information so that battery information may be output in real time using small system resources.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

A battery information compression apparatus according to one aspect of the present disclosure comprises: a battery information obtaining unit obtaining battery information for each of a plurality of batteries; and a communication code generating unit determining a representative value for a plurality of battery information, calculating a reference value for each of the plurality of battery information based on the plurality of battery information and the representative value, determining a first encoding code corresponding to the representative value and a second encoding code corresponding to the plurality of determined reference values according to a preset encoding rule, and generating a communication code including the first encoding code and the second encoding code.

The communication code generating unit may calculate a difference between battery information obtained at a first time point and battery information obtained at a current time point by the battery information obtaining unit for each of the plurality of batteries, and determine a minimum value among the plurality of calculated differences as the representative value, and wherein the first time point is earlier than the current time point.

The communication code generating unit may calculate the reference value for each of the plurality of battery information by calculating a difference between each of the plurality of calculated differences and the representative value.

The preset encoding rule may include a first encoding rule used to determine the first encoding code and a second encoding rule used to determine the second encoding code.

The communication code generating unit may determine a first header code and a first body code corresponding to the representative value according to the first encoding rule, and determine the first encoding code including the first header code and the first body code.

The communication code generating unit may determine a second header code corresponding to the plurality of reference values according to the second encoding rule, determine a second body code corresponding to each of the plurality of reference values according to the second encoding rule, and determine the second encoding code including the second header code and the plurality of second body codes.

The communication code generating unit may include the plurality of determined second body codes in the second encoding code according to an alignment rule preset for each of the plurality of batteries.

The battery information compression apparatus according to another aspect of the present disclosure may further comprise a communication unit outputting the communication code generated by the communication code generating unit to an external device.

A battery pack according to still another aspect of the present disclosure comprises the battery information compression apparatus according to an aspect of the present disclosure.

An energy storage system according to still another aspect of the present disclosure comprises the battery information compression apparatus according to an aspect of the present disclosure.

A battery information compression method according to still another aspect of the present disclosure comprises the steps of: obtaining, by a battery information obtaining unit, battery information for each of a plurality of batteries; determining, by a communication code generating unit, a representative value for a plurality of battery information; a reference value calculating step of calculating a reference value for each of the plurality of battery information based on the plurality of battery information and the representative value; determining, by the communication code generating unit, a first encoding code corresponding to the representative value and a second encoding code corresponding to the plurality of determined reference values according to a preset encoding rule; and generating, by the communication code generating unit, a communication code including the first encoding code and the second encoding code.

According to one aspect of the present disclosure, battery information for a plurality of batteries may be remarkably compressed into a communication code. In addition, as the communication code is output, system resources used for transmitting and receiving battery information for a plurality of batteries may be saved, and communication efficiency may be improved.

The effects of the present disclosure are not limited to the effects mentioned above, and other effects not mentioned will be clearly understood by those skilled in the art from the description of the claims.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 3 is a diagram schematically showing the communication code according to an embodiment of the present disclosure.

FIG. 4 is a diagram schematically showing a first encoding rule according to an embodiment of the present disclosure.

FIG. 5 is a diagram schematically showing a second encoding rule according to an embodiment of the present disclosure.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figures 1, 2:
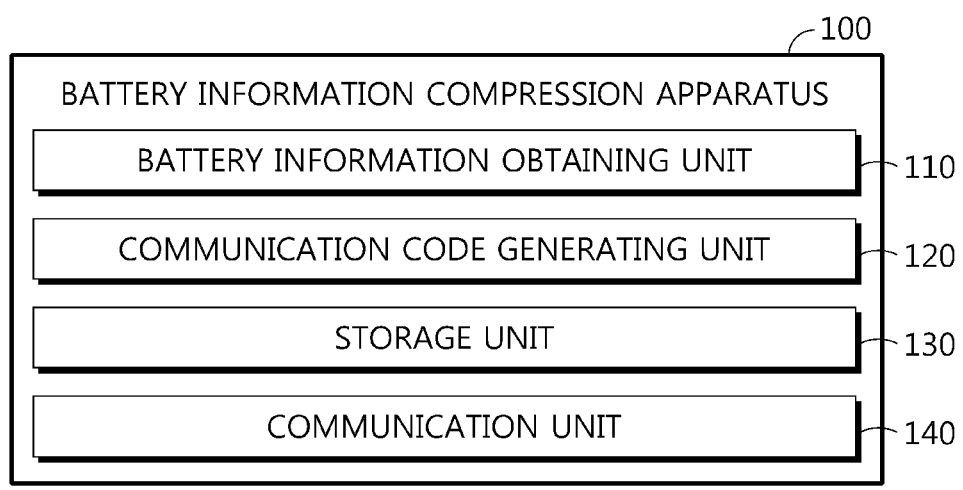
FIG. 1 is a diagram schematically showing a battery information compression apparatus according to an embodiment of the present disclosure.
FIG. 2 is a diagram schematically showing an embodiment in which the battery information compression apparatus according to an embodiment of the present disclosure generates communication codes for first to fourth batteries.

FIG. 1 is a diagram schematically showing a battery information compression apparatus 100 according to an embodiment of the present disclosure.

Referring to FIG. 1, the battery information compression apparatus 100 may include a battery information obtaining unit 110 and a communication code generating unit 120.

The battery information obtaining unit 110 may be configured to obtain battery information for each of a plurality of batteries.

Here, the battery information may include at least one of voltage, current, temperature, resistance, SOC, and SOH of the battery. The battery information listed is a non-limiting example, and information about a state value of the battery that can be measured and/or estimated by the battery management system may be included in the battery information that the battery information obtaining unit 110 can obtain.

Meanwhile, the battery means one physically separable independent cell including a negative electrode terminal and a positive electrode terminal. For example, one lithium-ion battery or lithium polymer battery may be regarded as a battery. Also, the battery may refer to a battery module in which a plurality of cells are connected in series and/or in parallel. Hereinafter, for convenience of explanation, the battery will be described as meaning one independent cell.

Specifically, the battery information obtaining unit 110 may periodically or aperiodically obtain battery information of each of the plurality of batteries. For example, the battery information obtaining unit 110 may receive battery information of each of the plurality of batteries from a device for measuring and/or estimating the battery information. As another example, the battery information obtaining unit 110 may obtain battery information of each of the plurality of batteries by accessing a storage unit 130 in which the battery information of each of the plurality of batteries is stored.

The communication code generating unit 120 may be configured to determine a representative value for a plurality of battery information.

Specifically, the communication code generating unit 120 may be configured to calculate a difference between battery information obtained at a previous time point and battery information obtained at a current time point by the battery information obtaining unit 110 for each of the plurality of batteries.

More specifically, the communication code generating unit 120 may calculate a difference for each of the plurality of battery information by calculating a difference between the battery information at the previous time point and the battery information at the current time point. For example, the communication code generating unit 120 may calculate a difference for each of the plurality of battery information according to the formula of "battery information at the previous time point—battery information at the current time point" or "battery information at the current time point—battery information at the previous time point". Hereinafter, for convenience of explanation, it will be described that the communication code generating unit 120 calculates a difference for each of the plurality of battery information according to the formula of "battery information at the current time point—battery information at the previous time point".

FIG. 2 is a diagram schematically showing an embodiment in which the battery information compression apparatus 100 according to an embodiment of the present disclosure generates communication codes TC for first to fourth batteries B1 to B4. In the embodiment of FIG. 2, the battery information is limited to a voltage value, but it should be noted that the battery information obtained by the battery information obtaining unit 110 is not limited by the embodiment of FIG. 2.

In the embodiment of FIG. 2, it is assumed that the battery information (voltage values) of the first to fourth batteries B1 to B4 obtained by the battery information obtaining unit 110 at the T1 time point are 3000 mV, 3010 mV, 3002 mV, and 3001 mV, respectively, and the voltage values of the first to fourth batteries B1 to B4 obtained at the T2 time point are 2999 mV, 3010 mV, 3001 mV, and 2995 mV, respectively. Here, the T1 time point may be a time point of a previous cycle when the battery information obtaining unit 110 received the battery information of the first to fourth batteries B1 to B4, and the T2 time point may be a time point of a current cycle when the battery information obtaining unit 110 receives the battery information of the first to fourth batteries B1 to B4.

The communication code generating unit 120 may calculate the difference between the voltage values of the first to fourth batteries B1 to B4 obtained at the T1 time point and the voltage values of the first to fourth batteries B1 to B4 obtained at the T2 time point, and calculate the voltage difference for each battery B1 to B4 as −1 mV, 0 mV, −1 mV and −6 mV.

The communication code generating unit 120 may determine a representative value among the plurality of calculated differences. For example, the communication code generating unit 120 may determine one of a minimum value, an average value, a median value, and a maximum value among the plurality of calculated differences as a representative value. Preferably, the communication code generating unit 120 may be configured to determine a minimum value as a representative value among the plurality of calculated differences.

In the embodiment of FIG. 2, the communication code generating unit 120 may set −6 mV, which is a minimum value, as the representative value RV among the plurality of calculated differences (−1 mV, 0 mV, −1 mV, and −6 mV).

The communication code generating unit 120 may be configured to calculate a reference value for each plurality of battery information based on the plurality of battery information and the representative value.

Specifically, the communication code generating unit 120 may be configured to calculate a reference value for each of the plurality of battery information by calculating a difference between the representative value and the difference corresponding to each of the plurality of battery information.

For example, the communication code generating unit 120 may calculate a reference value corresponding to each of the plurality of battery information according to the formula of "difference−representative value". Accordingly, the reference value generated by the communication code generating unit 120 may be a value greater than or equal to 0.

In the embodiment of FIG. 2, the communication code generating unit 120 may calculate "−1 mV−(−6 mv)" to calculate a first reference value for the first battery B1 information as 5 mV. In addition, the communication code generating unit 120 may calculate "0 mV−(−6 mV)" to calculate a second reference value for the second battery B2 information as 6 mV. In addition, the communication code generating unit 120 may calculate "−1 mV−(−6 mV)" to calculate a third reference value for the third battery B3 information as 5 mV. In addition, the communication code generating unit 120 may calculate "(−6 mV)−(−6 mV)" to calculate a fourth reference value for the fourth battery B4 information as 0 mV.

The communication code generating unit 120 may be configured to determine a first encoding code EC1 corresponding to the representative value and a second encoding code EC2 corresponding to the plurality of determined reference values according to a preset encoding rule.

Specifically, the preset encoding rule may include a first encoding rule used to determine the first encoding code EC1 and a second encoding rule used to determine the second encoding code EC2.

Preferably, the first encoding rule used to determine the first encoding code EC1 based on the representative value and the second encoding rule used to determine the second encoding code EC2 based on the plurality of reference values may be different from each other.

In the embodiment of FIG. 2, the communication code generating unit 120 may determine the first encoding code EC1 corresponding to the representative value RV of −6 mV according to the first encoding rule. In addition, the communication code generating unit 120 may determine second encoding code EC2 corresponding to the first reference value (5 mV) for the first battery B1, the second reference value (6 mV) for the second battery B2, the third reference value (5 mV) for the third battery B3, and the fourth reference value (0 mV) for the fourth battery B4 according to the second encoding rule. Details of how the communication code generating unit 120 generates the first encoding code EC1 and the second encoding code EC2 will be described later with reference to FIGS. 4 and 5.

The communication code generating unit 120 may be configured to generate a communication code TC including the first encoding code EC1 and the second encoding code EC2.

FIG. 3 is a diagram schematically showing the communication code TC according to an embodiment of the present disclosure.

Referring to FIG. 3, the communication code TC may include the first encoding code EC1 and the second encoding code EC2. The first encoding code EC1 may include a first header code HC1 and a first body code BC1. The second encoding code EC2 may include a second header code HC2 and a second body code BC2 for the first to fourth batteries B1 to B4. Here, the header code and the body code are values that can be generated by the above-described encoding rule, and their details will be described later with reference to FIGS. 4 and 5.

Specifically, the communication code generating unit 120 may generate one communication code TC by combining the first encoding code EC1 generated according to the first encoding rule and the second encoding code EC2 generated according to the second encoding rule.

That is, the communication code generating unit 120 may encode the battery information for a plurality of batteries and express it as one communication code TC. Accordingly, a plurality of battery information may be represented as one code, and also system resources required for storing and transmitting/receiving the plurality of battery information may be saved.

Meanwhile, the communication code generating 120 provided in the battery information compression apparatus 100 may selectively include processors known in the art, application-specific integrated circuit (ASIC), other chipsets, logic circuits, registers, communication modems, data processing devices, and the like to execute various control logic performed in the present disclosure. Also, when the control logic is implemented in software, the communication code generating 120 may be implemented as a set of program modules. At this time, the program module may be stored in a memory and executed by the communication code generating 120. The memory may be located inside or out of the communication code generating 120 and may be connected to the communication code generating 120 by various well-known means.

In addition, the battery information compression apparatus 100 may further include a storage unit 130. The storage unit 130 may store data necessary for operation and function of each component of the battery information compression apparatus 100, data generated in the process of performing the operation or function, or the like. The storage unit 130 is not particularly limited in its kind as long as it is a known information storage means that can record, erase, update and read data. As an example, the information storage means may include RAM, flash memory, ROM, EEPROM, registers, and the like. In addition, the storage unit 130 may store program codes in which processes executable by the communication code generating unit 120 are defined.

For example, the battery information about the plurality of batteries obtained by the battery information obtaining unit 110 may be stored in the storage unit 130. In addition, the first encoding rule and the second encoding rule may be stored in the storage unit 130, and the communication code generating unit 120 may generate the first encoding code EC1 and the second encoding code EC2 by using the first encoding rule and the second encoding rule stored in the storage unit 130. In addition, the storage unit 130 may store a packet structure for the communication code TC. The communication code generating unit 120 may generate a communication code TC by using the packet structure of the communication code TC stored in the storage unit 130.

Meanwhile, referring to FIG. 1, the battery information compression apparatus 100 according to an embodiment of the present disclosure may further include a communication unit 140.

The communication unit 140 may be configured to output the communication code TC generated by the communication code generating unit 120 to an external device.

The communication unit 140 may transmit the communication code TC to an external device through wired communication and/or wireless communication. For example, the external device may include a higher BMS (Battery Management System), an embedded system, and/or a server. Here, the wireless communication may use a mobile communication network such as 3G, 4G and 5G, and/or short-range wireless communication such as Bluetooth, Wifi, and Zigbee.

The battery information compression apparatus 100 according to an embodiment of the present disclosure may transmit the battery information for the plurality of batteries to an external device by simply outputting the communication code TC. That is, according to the battery information compression apparatus 100, since the battery information for a plurality of batteries is converted into an encoded code value and output as one communication code TC, system resources required to output a large amount of battery information may be reduced. In addition, since system resources are reduced, communication efficiency such as communication speed may be improved.

Hereinafter, with reference to FIGS. 4 and 5, details of how the communication code generating unit 120 determines the first encoding code EC1 and the second encoding code EC2 will be described.

FIG. 4 is a diagram schematically showing the first encoding rule ER1 according to an embodiment of the present disclosure. FIG. 5 is a diagram schematically showing the second encoding rule ER2 according to an embodiment of the present disclosure.

Referring to FIG. 4, the first encoding rule ER1 is an encoding rule capable of determining the lengths of the first header code HC1 and the first body code BC1 according to the minimum and maximum values of the first reference region RR1. Specifically, the lengths of the first header code HC1 and the first body code BC1 may be determined according to a region to which the representative value RV for the plurality of battery information belongs. Here, the first header code HC1 is a binary number value, and the length of the first body code BC1 is a code length when the representative value is converted into a binary number, where the unit may be bits.

Referring to FIG. 5, the second encoding rule ER2 is an encoding rule capable of determining the lengths of the second header code HC2 and the second body code BC2 according to the minimum and maximum values of the second reference region RR2. Specifically, the lengths of the second header code HC2 and the second body code BC2 may be determined according to a region to which the largest value among the reference values for the plurality of battery information belongs. Here, the second header code HC2 is a binary number. In addition, the length of the second body code BC2 is a code length when each reference value is converted into a binary number, where the unit may be bits.

The communication code generating unit 120 may be configured to determine the first header code HC1 and the first body code BC1 corresponding to the representative value according to the first encoding rule ER1. Also, the communication code generating unit 120 may be configured to determine the first encoding code EC1 including the first header code HC1 and the first body code BC1.

In the embodiment of FIG. 2, the representative value RV is −6 mV. In addition, −6 mV, which is the representative value RV, may belong to the first reference region RR1 having a minimum value of −8 and a maximum value of 7. Accordingly, the communication code generating unit 120 may determine 1110 corresponding to the representative value RV of −6 mV as the first header code HC1 according to the first encoding rule ER1. Also, the communication code generating unit 120 may determine the length of the first body code BC1 as 4 bits.

Also, the communication code generating unit 120 may calculate a binary value for −6 mV, which is the representative value RV, as 1010. Specifically, the communication code generating unit 120 may calculate a binary value for −6 mV according to a 2's complement.

For example, the communication code generating unit 120 may calculate the binary value for 6 mV as 0110. Here, the binary value of 6 may be calculated as 0110 instead of 110 in order to satisfy 4 bits, which is the length of the first body code BC1. In addition, the communication code generating unit 120 may convert the calculated 0110 into 2's complement to calculate a binary value for −6 mV as 1010.

The communication code generating unit 120 may determine the first encoding code EC1 as 11101010 to include 1110 as the first header code HC1 and 1010 as the first body code BC1.

The communication code generating unit 120 may be configured to determine a second header code HC2 corresponding to the plurality of reference values according to the second encoding rule ER2, and to determine a second body code BC2 corresponding to each the plurality of reference values according to the second encoding rule ER2. Also, the communication code generating unit 120 may be configured to determine a second encoding code EC2 including the second header code HC2 and the plurality of second body codes BC2.

In the embodiment of FIG. 2, the first to fourth reference values are 5 mV, 6 mV, 5 mV, and 0 mV, respectively. The maximum value of 6 mV among the first to fourth reference values may belong to the second reference region RR2 having a minimum value of 0 and a maximum value of 7. Accordingly, the communication code generating unit 120 may determine the second header code HC2 as 110 according to the second encoding rule ER2.

Also, the communication code generating unit 120 may convert each reference value into a binary value having a code length of 3 bits.

In the embodiment of FIG. 2, the communication code generating unit 120 may determine the second body code BC21 of the first battery B1 as 101 according to the second encoding rule ER2. Also, the communication code generating unit 120 may determine the second body code BC22 of the second battery B2 as 110 according to the second encoding rule ER2. Also, the communication code generating unit 120 may determine the second body code BC23 of the third battery B3 as 101 according to the second encoding rule ER2. Finally, the communication code generating unit 120 may determine second body code BC24 of the fourth battery B4 as 000 according to the second encoding rule ER2.

In addition, the communication code generating unit 120 may be configured to include the plurality of determined second body codes BC2 in the second encoding code EC2 according to an alignment rule preset in each of the plurality of batteries. Here, the alignment rule may be determined in ascending order of identification numbers for the plurality of batteries. For example, in the embodiment of FIG. 2, it is assumed that alignment rules are preset in the order of the first battery B1, the second battery B2, the third battery B3, and the fourth battery B4.

In the embodiment of FIG. 3, when the alignment rule is determined in the order of the first battery B1, the second battery B2, the third battery B3, and the fourth battery B4, the communication code generating unit 120 may determine the second encoding code EC2 the second encoding code EC2 includes 110 that is the second header code HC2, 101 that is the second body code BC21 of the first battery B1, 110 that is the second body code BC22 of the second battery B2, 101 that is the second body code BC23 of the third battery B3, and 000 that is the second body code BC24 of the fourth battery B4, in order. That is, the communication code generating unit 120 may determine the second encoding code EC2 as 110101110101000.

Figure 6:
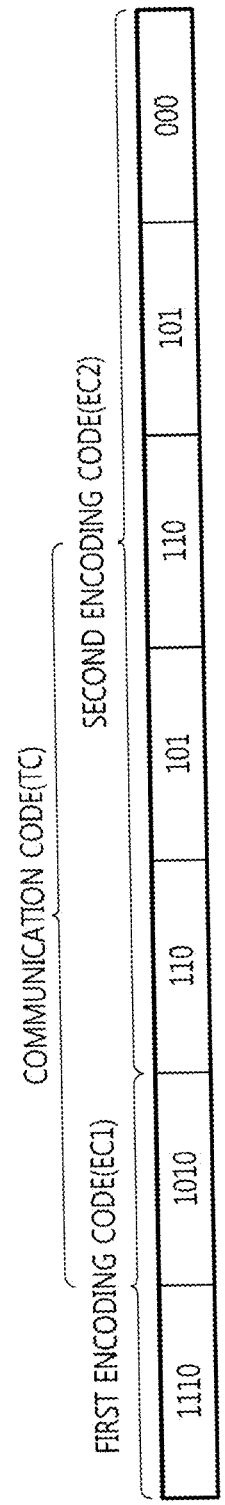
FIG. 6 is a diagram showing a communication code generated according to the embodiment of FIG. 2 by the battery information compression apparatus according to an embodiment of the present disclosure.

FIG. 6 is a diagram showing the communication code TC generated according to the embodiment of FIG. 2 by the battery information compression apparatus 100 according to an embodiment of the present disclosure.

In the embodiment of FIG. 6, the communication code generating unit 120 may determine the communication code TC as 11101010110101110101000. Also, the communication code TC generated by the communication code generating unit 120 may be output through the communication unit 140.

That is, the battery information compression apparatus 100 according to an embodiment of the present disclosure does not output the battery information for the plurality of batteries as it is, but outputs the communication code TC generated through encoding, thereby drastically reducing the data amount for the battery information of the plurality of batteries. Therefore, there is an advantage in that the use of communication system resources can be drastically reduced in the process of transmitting and receiving the battery information for a plurality of batteries.

For example, it is assumed that the battery information compression apparatus 100 is applied to a device or system including a plurality of battery cells, such as an energy storage system (ESS) including a plurality of batteries. Here, the energy storage system may be configured with a plurality of battery racks, the battery rack may be configured with a plurality of battery packs, and the battery pack may be configured with a plurality of battery modules or a plurality of battery cells. Conventionally, when an energy storage system outputs battery information for a plurality of battery cells to a server, etc., the battery information for the plurality of battery cells must be output separately, so system resources consumed for communication are seriously wasted. On the other hand, since the battery information compression apparatus 100 according to the present disclosure may output battery information for a plurality of battery cells by outputting an encoded communication code TC, communication system resources are used more efficiently and thus communication efficiency may be dramatically improved.

Meanwhile, the communication code generating unit 120 may determine one of the plurality of battery information as a representative value.

Specifically, when there is no battery information previously obtained by the battery information obtaining unit 110, the communication code generating unit 120 may determine a representative value based on battery information obtained at a current time point by the battery information obtaining unit 110.

For example, the communication code generating unit 120 may determine one of a minimum value, an average value, a median value, and a maximum value among the plurality of battery information as a representative value. Preferably, the communication code generating unit 120 may determine a minimum value among the plurality of battery information as a representative value in order to minimize the length of the generated communication code TC.

In addition, the communication code generating unit 120 may calculate a reference value corresponding to each of the plurality of battery information based on the difference between the plurality of battery information and the representative value. Thereafter, the communication code generating unit 120 may determine a first encoding code EC1 corresponding to the representative value according to the first encoding rule ER1, and may determine a second encoding code EC2 corresponding to the plurality of reference values according to the second encoding rule ER2. Finally, the communication code generating unit 120 may generate a communication code TC that generates the first encoding code EC1 and the second encoding code EC2.

For example, when the battery information obtaining unit 110 obtains battery information for a plurality of batteries for the first time, battery information for the plurality of batteries obtained at a previous time point may not exist. In this case, if the communication unit 140 outputs the plurality of battery information individually, system resources may be unnecessarily wasted in the initial communication process.

Accordingly, the battery information compression apparatus 100 may generate a communication code TC based on the plurality of battery information at the current time point for efficient output of the battery information.

The battery information compression apparatus 100 according to the present disclosure may be applied to a BMS (Battery Management System). That is, the BMS according to the present disclosure may include the battery information compression apparatus 100 described above. In this configuration, at least some of the components of the battery information compression apparatus 100 may be implemented by supplementing or adding functions of the configuration included in the conventional BMS. For example, the battery information obtaining unit 110, the communication code generating unit 120, the communication unit 140 and the storage unit 130 of the battery information compression apparatus 100 may be implemented as components of the BMS.

The battery information compression apparatus 100 according to the present disclosure may be provided in a battery pack. That is, the battery pack according to the present disclosure may include the above-described battery information compression apparatus 100 and one or more battery cells. In addition, the battery pack may further include electrical equipment (relays, fuses, etc.) and a case.

Figure 7:
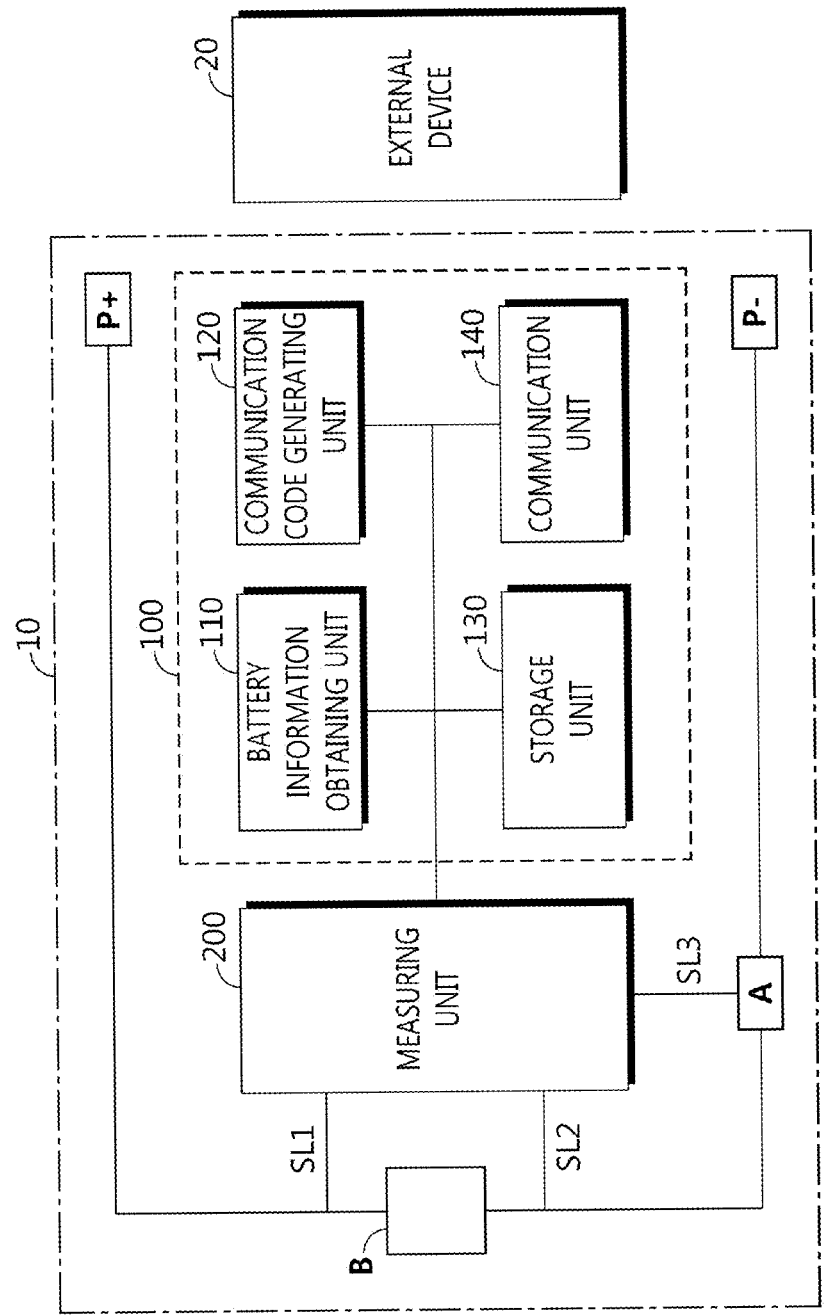
FIG. 7 is a diagram schematically showing an exemplary configuration of a battery pack according to another embodiment of the present disclosure.

FIG. 7 is a diagram schematically showing an exemplary configuration of a battery pack according to another embodiment of the present disclosure.

The battery pack may include a battery, a measuring unit, and the battery information compression apparatus 100. In addition, the battery information compression apparatus 100 may be connected to communicate with an external device.

The positive electrode terminal of the battery B may be connected to the positive electrode terminal P+ of the battery pack 10, and the negative electrode terminal of the battery B may be connected to the negative electrode terminal P− of the battery pack 10.

A measuring unit 200 may be connected to a first sensing line SL1, a second sensing line SL2, and a third sensing line SL3. Specifically, the measuring unit 200 may be connected to a positive electrode terminal of the battery B through the first sensing line SL1, and may be connected to a negative electrode terminal of the battery B through the second sensing line SL2. The measuring unit 200 may measure the voltage of the battery B based on the voltage measured at each of the first sensing line SL1 and the second sensing line SL2.

In addition, the measuring unit 200 may be connected to an ampere meter A through the third sensing line SL3. For example, the ampere meter A may be an ammeter or a shunt resistor capable of measuring the charging current and the discharging current of the battery B. The measuring unit 200 may calculate the amount of charge by measuring the charging current of the battery B through the third sensing line SL3. Also, the measuring unit 200 may calculate the amount of discharge by measuring the discharge current of the battery B through the third sensing line SL3.

In the above, only the embodiment in which the measuring unit 200 measures the voltage and current of the battery B has been described, but the measuring unit 200 may be connected to an additional sensing line to measure the temperature of the battery B. In addition, the measuring unit 200 may estimate information that may be included in the battery information, such as internal resistance, SOC and SOH of the battery B, based on the measured voltage and/or current of the battery B.

The external device 20 may be a higher BMS, an embedded system, or a server capable of receiving the communication code TC from the communication unit 140.

The external device 20 may obtain battery information for each of the plurality of batteries by interpreting the communication code TC received from the communication unit 140. For example, the external device 20 may obtain battery information for each of the plurality of batteries from the communication code TC by reversely using the method in which the communication code TC determining unit determines the communication code TC. To this end, the external device 20 may equally store the first encoding rule ER1 and the second encoding rule ER2 stored in the battery information compression apparatus 100.

For example, it is assumed that the external device 20 receives the communication code TC according to the embodiment of FIG. 6 from the communication unit 140 of the battery information compression apparatus 100. The external device 20 may read from the most significant bit (MSB) of the communication code TC.

In the embodiment of FIG. 6, the external device 20 may read one bit at a time from the most significant bit in 11101010110101110101000 that is the communication code TC. The external device 20 may read the first header code HC1 defined in the first encoding rule ER1 while accumulatively reading one bit at a time in the order of 1, 1, 1, 0. Here, according to the first encoding rule ER1, 1110 is a value belonging to the first header code HC1, and the length of the corresponding first body code BC1 is 4 bits. The external device 20 may determine the first header code HC1 as 1110 and the first body code BC1 as 1010 in the communication code TC. In addition, since the first body code BC1 should be included in the range of −8 to 7, the external device 20 may know that 1010 is a negative number. Accordingly, the external device 20 may determine the representative value RV corresponding to the communication code TC as −6.

Subsequently, the external device 20 may read one bit at a time from the most significant bit in 110101110101000 excluding 11101010 in the communication code TC. The external device 20 may read the second header code HC2 defined in the second encoding rule ER2 while accumulatively reading one bit at a time in the order of 1, 1, 0. Here, according to the second encoding rule ER2, 110 is a value belonging to the second header code HC2, and the length of the corresponding second body code BC2 is 3 bits. The external device 20 may determine the second header code HC2 as 110 in 110101110101000, and divide the remaining codes (101110101000) by 3 bits. The divided bits may be 101, 110, 101, and 000. Here, when converting binary values to decimal values, 101 is 5, 110 is 6, and 000 is 0.

The external device 20 may calculate the voltage difference of the first battery B1 as −1 mV by adding the representative value RV to the binary value of 101 corresponding to the first battery B1. In addition, the external device 20 may calculate the voltage difference of the second battery B2 as 0 mV by adding the representative value RV to the binary value of 110 corresponding to the second battery B2. In addition, the external device 20 may calculate the voltage difference of the third battery B3 as −1 mV by adding the representative value RV to the binary value of 101 corresponding to the third battery B3. In addition, the external device 20 may calculate the voltage difference of the fourth battery B4 as 0 mV by adding the representative value RV to the binary value of 000 corresponding to the fourth battery B4.

Thereafter, the external device 20 may obtain the voltage values of the first to fourth batteries at the T2 time point by adding the calculated voltage difference to the voltage values of the first to fourth batteries obtained at the T1 time point, respectively.

For example, the external device 20 may calculate the voltage value of the first battery B1 at the T2 time point as 2999 mV by adding the calculated voltage difference of −1 mV to the voltage value of 3000 mV of the first battery B1 at the T1 time point. In this way, the external device 20 may calculate the voltage value of the second battery B2 as 3010 mV, calculate the voltage value of the third battery B3 as 3001 mV, and calculate the voltage value of the fourth battery B4 as 2995 mV.

That is, the battery information compression apparatus according to an embodiment of the present disclosure has an advantage of improving communication efficiency for the plurality of battery information by outputting the battery information of the plurality of batteries as an encoded communication code.

Figure 8:
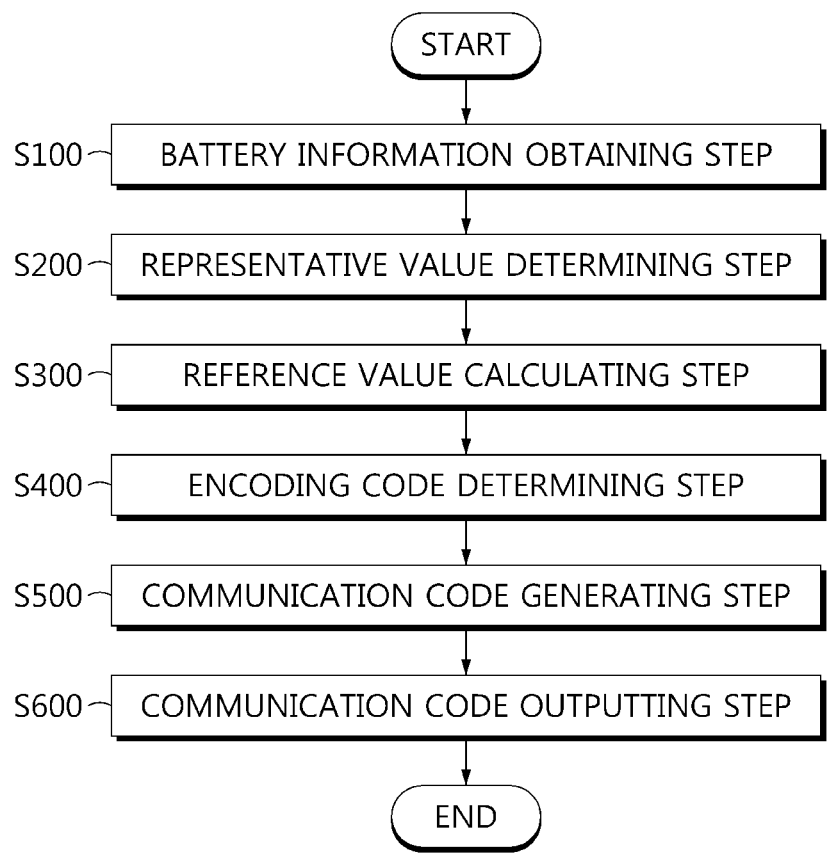
FIG. 8 is a diagram schematically showing a battery information compression method according to still another embodiment of the present disclosure.

FIG. 8 is a diagram schematically showing a battery information compression method according to still another embodiment of the present disclosure.

Referring to FIG. 8, the battery information compression method may include a battery information obtaining step (S100), a representative value determining step (S200), a reference value calculating step (S300), an encoding code determining step (S400) and a communication code generating step (S500).

Preferably, each step of the battery information compression method may be performed by the battery information compression apparatus 100. Hereinafter, for convenience of explanation, contents overlapping with the previously described contents will be omitted or briefly described.

The battery information obtaining step (S100) is a step of obtaining battery information for each of a plurality of batteries, and may be performed by the battery information obtaining unit 110.

The battery information obtaining unit 110 may periodically or aperiodically obtain battery information for the plurality of batteries.

For example, in the embodiment of FIG. 2, the battery information obtaining unit 110 may obtain voltage values for the first to fourth batteries B1 to B4 at the T1 time point, and obtain voltage values for the first to fourth batteries B1 to B4 at the T2 time point.

The representative value determining step (S200) is a step of determining a representative value for a plurality of battery information, and may be performed by the communication code generating unit 120.

Specifically, the communication code generating unit 120 may calculate a difference between battery information of the plurality of batteries obtained at a previous time point and battery information of the plurality of batteries obtained at a current time point. Also, the communication code generating unit 120 may determine a minimum value among the plurality of calculated differences as a representative value.

For example, in the embodiment of FIG. 2, the voltage differences of the first to fourth batteries B1 to B4 may be calculated as −1 mV, 0 mV, −1 mV, and −6 mV. The communication code generating unit 120 may determine −6 mV, which is a minimum value, as a representative value.

The reference value calculating step (S300) is a step of calculating a reference value for each of the plurality of battery information based on the plurality of battery information and the representative value, and may be performed by the communication code generating unit 120.

Specifically, the communication code generating unit 120 may calculate a reference value for each of the battery by calculating the difference between the representative value and the difference calculated for the plurality of batteries.

For example, in the embodiment of FIG. 2, the communication code generating unit 120 may calculate the reference value for the first battery B1 as 5 mV by calculating "−1−(−6)". The communication code generating unit 120 may calculate the reference value for the second battery B2 as 6 mV by calculating "0−(−6)". The communication code generating unit 120 may calculate the reference value for the third battery B3 as 5 mV by calculating "−1−(−6)". The communication code generating unit 120 may calculate the reference value for the fourth battery B4 as 0 mV by calculating "(−6)−(−6)".

The encoding code determining step (S400) is a step of determining a first encoding code EC1 corresponding to the representative value and a second encoding code EC2 corresponding to the plurality of determined reference values according to a preset encoding rule, and may be performed by the communication code TC determining unit.

Specifically, the communication code TC determining unit may determine a first header code HC1 and a first body code BC1 corresponding to the representative value based on the first encoding rule ER1. Also, the communication code TC determining unit may determine a second header code HC2 and a second body code BC2 of each of the plurality of batteries based on the second encoding rule ER2.

For example, in the embodiment of FIG. 6, the communication code TC determining unit may determine the first header code HC1 as 1110 and determine the first body code BC1 as 1010. Also, the communication code TC determining unit may determine the first encoding code EC1 as 11101010 by combining the first header code HC1 and the first body code BC1.

Also, in the embodiment of FIG. 6, the communication code TC determining unit may determine the second header code HC2 as 110. In addition, the communication code TC determining unit may determine the second body code BC21 of the first battery B1 as 101, determine the second body code BC22 of the second battery B2 as 110, determine the second body code BC23 of the third battery B3 as 101, and determine the second body code BC24 of the fourth battery B4 as 000. In addition, the communication code TC determining unit may determine the second encoding code EC2 as 110101110101000 by combining the first header code HC1, the second body code BC21 of the first battery B1, the second body code BC22 of the second battery B2, the second body code BC23 of the third battery B3, and the second body code BC24 of the fourth battery B4.

The communication code generating step (S500) is a step of generating a communication code TC including the first encoding code EC1 and the second encoding code EC2, and may be performed by the communication code TC determining unit.

For example, in the embodiment of FIG. 6, the communication code generating unit 120 may determine the communication code TC as 11101010110101110101000 by combining the first encoding code EC1 and the second encoding code EC2.

Referring to FIG. 8 further, the battery information compression method may further include a communication code outputting step (S600).

The communication code outputting step (S600) is a step of outputting the communication code TC, and may be performed by the communication unit 140.

Specifically, the communication unit 140 may output the communication code TC to an external device connected through wired communication and/or wireless communication. Upon receiving the communication code TC from the communication unit 140, the external device may obtain the battery information for each of the plurality of batteries from the communication code TC by reversely using a method in which the communication code TC determining unit determines the communication code TC.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: battery pack
20: external device
100: battery information compression apparatus
110: battery information obtaining unit
120: communication code generating unit
130: storage unit
140: communication unit
200: measuring unit

What is claimed is:

1. A battery information compression apparatus, comprising:
   a battery information obtaining unit configured to obtain battery information for each of a plurality of batteries; and
   a communication code generating unit configured to determine a representative value for a plurality of battery information, calculate a reference value for each of the plurality of battery information based on the plurality of battery information and the representative value, determine a first encoding code corresponding to the representative value and a second encoding code corresponding to the plurality of calculated reference values according to a preset encoding rule, and generate a communication code including the first encoding code and the second encoding code.

2. The battery information compression apparatus according to claim 1,
   wherein the communication code generating unit is configured to calculate a difference between battery information obtained at a first time point and battery information obtained at a current time point by the battery information obtaining unit for each of the plurality of batteries, and determine a minimum value among the plurality of calculated differences as the representative value, and
   wherein the first time point is earlier than the current time point.

3. The battery information compression apparatus according to claim 2,
   wherein the communication code generating unit is configured to calculate the reference value for each of the plurality of battery information by calculating a difference between each of the plurality of calculated differences and the representative value.

4. The battery information compression apparatus according to claim 1, wherein the preset encoding rule includes a first encoding rule used to determine the first encoding code and a second encoding rule used to determine the second encoding code.

5. The battery information compression apparatus according to claim 4,
wherein the communication code generating unit is configured to determine a first header code and a first body code corresponding to the representative value according to the first encoding rule, and determine the first encoding code including the first header code and the first body code.

6. The battery information compression apparatus according to claim 4,
wherein the communication code generating unit is configured to determine a second header code corresponding to the plurality of reference values according to the second encoding rule, determine a second body code corresponding to each of the plurality of reference values according to the second encoding rule, and determine the second encoding code including the second header code and the plurality of second body codes.

7. The battery information compression apparatus according to claim 6,
wherein the communication code generating unit includes the plurality of determined second body codes in the second encoding code according to an alignment rule preset for each of the plurality of batteries.

8. The battery information compression apparatus according to claim 1, further comprising:
a communication unit configured to output the communication code generated by the communication code generating unit to an external device.

9. A battery pack, comprising:
the battery information compression apparatus according to claim 1.

10. An energy storage system, comprising:
the battery information compression apparatus according to claim 1.

11. A battery information compression method, comprising:
obtaining, by a battery information obtaining unit, battery information for each of a plurality of batteries;
determining, by a communication code generating unit, a representative value for a plurality of battery information;
calculating, by the communication code generating unit, a reference value for each of the plurality of battery information based on the plurality of battery information and the representative value;
determining, by the communication code generating unit, a first encoding code corresponding to the representative value and a second encoding code corresponding to the plurality of calculated reference values according to a preset encoding rule; and
generating, by the communication code generating unit, a communication code including the first encoding code and the second encoding code.

* * * * *